United States Patent
Marson et al.

(10) Patent No.: US 12,547,754 B2
(45) Date of Patent: Feb. 10, 2026

(54) PROTECTION OF STORED AND COMMUNICATED SECRET DATA AGAINST SIDE-CHANNEL ATTACKS

(71) Applicant: Cryptography Research, Inc., San Jose, CA (US)

(72) Inventors: Mark Evan Marson, Carlsbad, CA (US); Michael Alexander Hamburg, Laguna Beach, CA (US); Helena Handschuh, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 567 days.

(21) Appl. No.: 17/834,511

(22) Filed: Jun. 7, 2022

(65) Prior Publication Data
US 2022/0398339 A1    Dec. 15, 2022

Related U.S. Application Data

(60) Provisional application No. 63/202,455, filed on Jun. 11, 2021.

(51) Int. Cl.
| | | |
|---|---|---|
| G06F 21/00 | (2013.01) | |
| G06F 12/14 | (2006.01) | |
| G06F 21/62 | (2013.01) | |

(52) U.S. Cl.
CPC ...... *G06F 21/6227* (2013.01); *G06F 12/1408* (2013.01); *G06F 12/1425* (2013.01); *G06F 12/1483* (2013.01); *G06F 2221/2125* (2013.01)

(58) Field of Classification Search
CPC ............ G06F 21/6227; G06F 12/1408; G06F 12/1425; G06F 12/1483; G06F 2221/2125; G06F 2212/1052
See application file for complete search history.

(56) References Cited

U.S. PATENT DOCUMENTS

| | | | | |
|---|---|---|---|---|
| 7,895,327 B2* | 2/2011 | Klimov | .................... | G06F 21/75 |
| | | | | 709/200 |
| 2009/0080647 A1* | 3/2009 | Mantin | .................. | H04L 9/0625 |
| | | | | 380/29 |
| 2012/0278897 A1* | 11/2012 | Ang | ....................... | H04L 61/301 |
| | | | | 726/26 |
| 2015/0248357 A1* | 9/2015 | Kaplan | ............... | G06F 12/1408 |
| | | | | 713/193 |

(Continued)

OTHER PUBLICATIONS

Lohrke, Heiko et al., "No. Place to Hide: Contactless Probing of Secret Data on FPGAs", From Cryptographic Hardware and Embedded systems—CHES 2016: 18th International Conference, Santa Barbara, CA, USA, Aug. 17-19, 2016, Proceedings; 2016, Downloaded from: https://www.researchgate.net/publication/304570925_No_Place_to_Hide_Contactless_Probing_of_Secret_Data_on_FPGAs on Mar. 11, 2020. 28 Pages.

(Continued)

*Primary Examiner* — Ghazal B Shehni
(74) *Attorney, Agent, or Firm* — Lowenstein Sandler LLP

(57) ABSTRACT

Described are implementations directed to protecting secret data against adversarial attacks by obfuscating the secret data during storage and communication. Obfuscation techniques include, among other things, splitting secret data into a plurality of portions, performing rotation of secret data, splitting secret data into a plurality of shares, modifying shares of secret data in view of the values of the shares, and various other protection mechanisms.

20 Claims, 9 Drawing Sheets

(56) References Cited

U.S. PATENT DOCUMENTS

| | | | | |
|---|---|---|---|---|
| 2016/0070918 A1* | 3/2016 | Ciordas | ............... | G06F 21/79 |
| | | | | 726/27 |
| 2017/0286320 A1* | 10/2017 | Chhabra | ............... | G06F 12/145 |
| 2017/0344759 A1* | 11/2017 | Choi | ............... | G06F 1/06 |
| 2019/0130104 A1* | 5/2019 | Carlson | ............... | G06F 12/0802 |

OTHER PUBLICATIONS

Wang, Huanyu et al., "Probing Attacks on Integrated Circuits: Challenges and Research Opportunities", IEEE CEDA, IEEE CASS, IEEE SSCS, TTC, IEEE Design & Test, vol. 34, No. 5, Sep./Oct. 2017, pp. 63-71, doi:10.119/MDAT.2017.2729398. 9 pages.

* cited by examiner

PROTECTION OF STORED AND COMMUNICATED SECRET DATA AGAINST SIDE-CHANNEL ATTACKS

RELATED APPLICATIONS

This application claims the benefit of U.S. Provisional Patent Application No. 63/202,455, filed Jun. 11, 2021, which is hereby incorporated herein by reference

TECHNICAL FIELD

The present disclosure is directed to protection, against side-channel attacks, of confidential information stored in memory devices and repeatedly accessed by applications and various outside entities. More specifically, aspects of the present disclosure are directed to storing and communicating confidential information in a reversibly-modified form to prevent an attacker from collecting data sufficient for successful identification of the confidential information.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
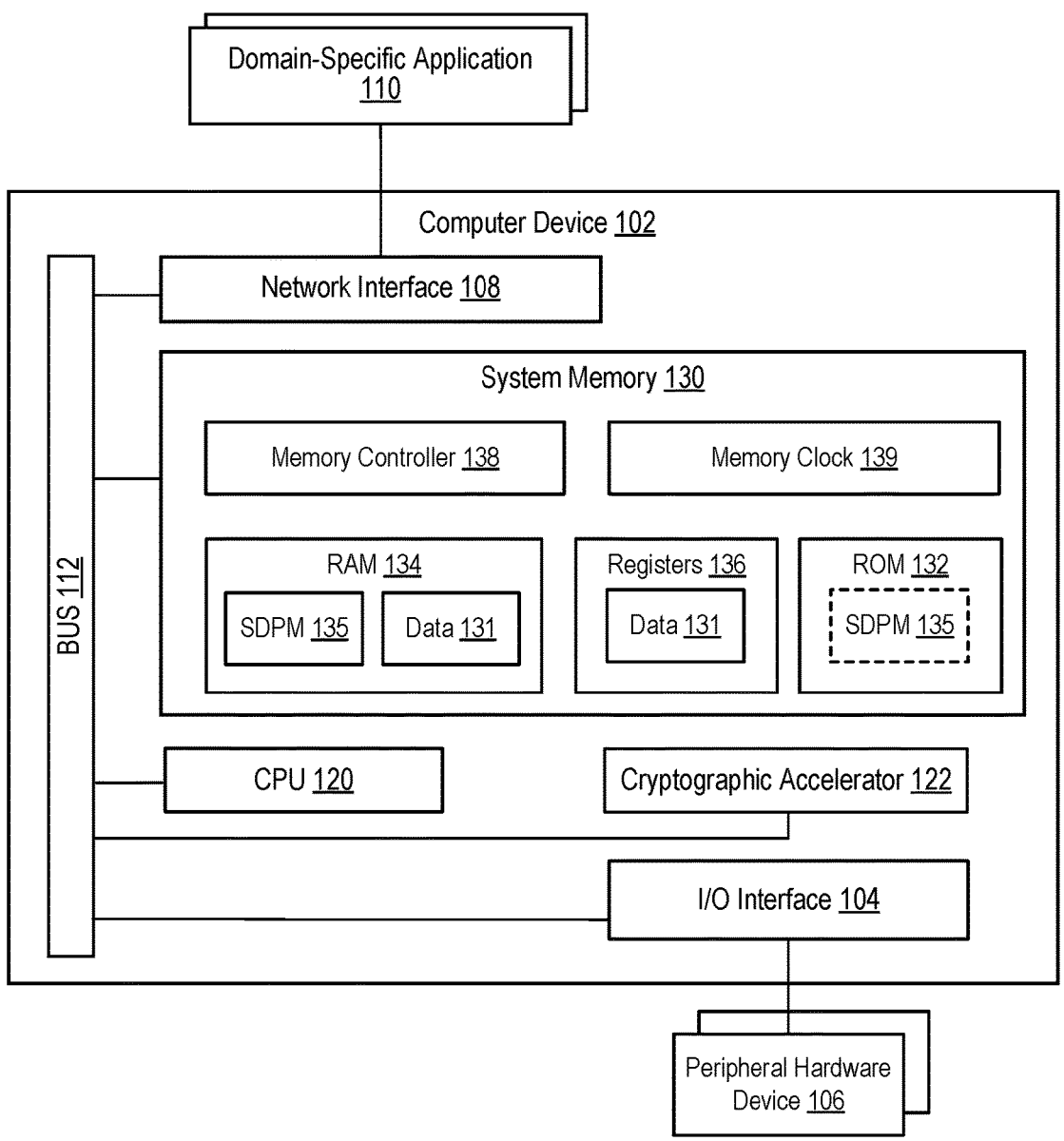
FIG. 1 is a block diagram illustrating an example computer system in which various implementations of the present disclosure may operate.

Modern computational and data-storing applications often operate with information that is maintained in secrecy. Such confidential information may include secret messages that need to be protected from unauthorized accesses, cryptographic keys, as well as various other secret data. Storing in memory devices for a significant amount of time and communicating repeatedly the same confidential information over physical communication channels (e.g., buses and interconnect lines) makes the information vulnerable to malicious or unauthorized attacks. Even where a cryptographic algorithm is sufficiently resilient against computational attempts to break a cryptographic key, such resilience may not be sufficient if the key is exposed to a physical attack. A side-channel attack may be performed by monitoring physical emissions produced by electronic circuits of the targeted device. Such emissions may be of acoustic, electric, magnetic, optical, thermal types, and so on. In one example, a laser voltage (laser timing) probing technique may involve monitoring a bus or another interconnect by a spectrograph that uses a laser to determine variations of the optical response (e.g., reflectivity) while a sequence of bits of secret information is being communicated. If the same sequence of bits is communicated repeatedly, an attacker can correlate variations in the optical response of the bus (or the memory device itself) with 0s and 1s of the secret information. Upon collecting a sufficient amount of statistical correlations, the attacker may be able to discover the secret information.

Aspects and implementations of the present disclosure address these and other challenges of the existing technology by disclosing systems and methods of protecting secret information from being revealed during extended storage and repeated retrievals. In one implementation, secret information may be split into multiple portions, portions may be shuffled. Additionally, the order of bits in the portions may be changed (e.g., inverted). Shuffling and inversion of portions may be performed in an order determined by control bits. Control bits may be read out from a register whose stored data is updated regularly, e.g., from a shift register. In another implementation, secret information may be rotated cyclically to an amount determined by control bits. In another implementation, secret information may be replaced with a complement, the complement obtained by adding (or performing some other arithmetic operation), e.g., in a bitwise manner, a number generated in view of control bits. In various implementations listed above, obfuscation operations may be reversible, in a sense that the secret information may be recoverable if control bits are communicated (or stored) together with the obfuscated information. In yet another implementation, secret information may be split between two (or more) shares in such a way that an arithmetic operation performed on the shares (e.g., a bitwise addition of the shares) recovers the secret information. Subsequently, each of the shares may be modified/updated using a function (or several functions) that depends on one or more of the shares in such a way that maintains a certain combination of the shares (e.g., their bitwise sum) invariant and equal to the secret information. This ensures that secret information remains recoverable from the modified shares. To avoid short-cycling (getting stuck in a sequence of a small number of different values), an additional arithmetic operation (which may be controlled by control bits) that maintains the invariant may be performed. In some implementations, the function(s) and the arithmetic operations may be defined on a finite (Galois) field. Various operations described in the instant disclosure have an advantage of improving safety of storing and communicating of secret information.

FIG. 1 is a block diagram illustrating an example computer system 100 in which various implementations of the present disclosure may operate. The example computer system 100 may be a desktop computer, a tablet, a smartphone, a server (local or remote), a thin/lean client, and the like. The example computer system 100 may include, but not be limited to, a computer device 102 having one or more processors (e.g., capable of executing binary instructions) such as central processing units (CPUs) 120, one or more graphics processing units (not shown), one or more cryptographic accelerators 122, and one or more system memory 130 devices. "Processor" may further refer to any device capable of executing instructions encoding arithmetic, logical, or I/O operations. In one illustrative example, a processor may follow Von Neumann architectural model and may include an arithmetic logic unit (ALU), a control unit, and a plurality of registers.

Computer device 102 may further include an input/output (I/O) interface 104 to facilitate connection of the computer device 102 to peripheral hardware devices 106 such as card readers, terminals, printers, scanners, internet-of-things devices, and the like. The computer device 102 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 102. Various hardware components of computer device 102 may be connected via a bus 112 which may have its own logic circuits, e.g., a bus interface logic unit.

CPU 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more applications, although more than one processor core (or a logical processor) may be assigned to a single application for parallel processing. A multi-core CPU 120 may simultaneously execute multiple instructions. A single-core CPU 120 may typically execute one instruction at a time (or process a single pipeline of instructions). CPU 120 may be implemented as a single integrated circuit, two or more integrated circuits, or may be a component of a multi-chip module.

The example computer system 100 may be a system deploying one or more domain-specific applications 110, e.g., user authentication applications, banking applications, data processing applications, and so on. Some of applications 110 may be cryptographic applications or applications deploying methods of cryptographic protection and applications that use neural networks. Application(s) 110 may be instantiated on the same computer device 102, e.g., by an operating system executed by CPU 120 and residing in the system memory 130. Alternatively, application(s) 110 may be instantiated by a guest operating system supported by a virtual machine monitor (hypervisor) executed by the CPU 120. In some implementations, application(s) 110 may reside on a remote access client device or a remote server (not shown), with computer device 102 providing computational support for the client device and/or the remote server. Application(s) 110 may store various secure data in system memory 130, including cryptographic keys, encrypted messages, files, and other information.

System memory 130 may refer to a volatile or non-volatile memory and may include a read-only memory (ROM) 132, a random-access memory (RAM) 134, registers 136, as well as various other memory devices not explicitly depicted in FIG. 1, such as electrically-erasable programmable read-only memory (EEPROM), flash memory, flip-flop memory, or any other device capable of storing data. RAM 134 may be a dynamic random-access memory (DRAM), synchronous DRAM (SDRAM), a static memory, such as static random-access memory (SRAM), and the like. Data 131 may be stored in various memory devices of system memory 130, including RAM 134, registers 136, and other memory devices. Data 131 may include any data from application(s) 110 as well as data used by any other component or process of computer device 102. Data 131 may include both open information and secret information including various cryptographic keys (private keys, secret keys, symmetric keys, etc.) and/or any information protected with such keys (digital signatures, message authentication codes, encrypted data, etc.).

System memory 130 may also store a secret data protection module (SDPM) 135 installed to perform operations described in the instant disclosure. In some implementations, SDPM 135 may be stored (e.g., upon booting up computer device 102) in RAM 134. In some implementations, as depicted by the respective dashed box, SDPM 135 may be installed in ROM 132. In some implementations, instructions by SDPM 135 may be executed by a memory controller 138 of system memory 130. Memory controller 138 may control memory read, write, erase, etc., operations performed in system memory 130. For example, a request by an application 110 to provide to CPU 120 (or to cryptographic accelerator 122) secret data stored in RAM 134 (or registers 136) may be received by SDPM 135. SDPM 135 may output instructions to memory controller 138 to obfuscate the requested secret data before the secret data is communicated to CPU 120 (or cryptographic accelerator 122) over bus 112. In some implementations, when no request to provide data is received by system memory 130, SDPM 135 of memory controller 138 may from time to time (e.g., periodically or at irregular time intervals) perform various obfuscation operations on stored secret data (e.g., data 131), such as replacing secret data with one or more of its complements, splitting secret data into portions or shares, updating portions or shares, and so on.

In some implementations, for additional protection, timing of obfuscation operations may be controlled by internal memory clock 139, which may operate independently from an outside clock, e.g., a clock of the computer device 102. An outside clock may be successfully tampered with by an attacker; for example, the attacker may freeze the clock or slow it down to eliminate data obfuscation operations described above. For additional protection against such outside attacks, various operations may be controlled by an internal memory clock 139. Memory clock 139 may be any device, circuit, or mechanism that runs independently (e.g., asynchronously) of an external clock. Memory clock 139 may include one or more ring oscillators. SDPM 135 may monitor values output by memory clock 139 and initiate data re-saving when a certain value is detected (e.g., an output bit of the ring oscillator changes from 0 to 1, or vice versa). Memory clock 139 may be used to determine a sequence of events that are unequally spaced (in time) and ties the obfuscation operations (e.g., share updates or reshufflings) to those events. For example, internal clock 139 may be configured to generate outputs that follow an irregular pattern, to make it more difficult for an attacker to collect meaningful statistics. In some implementations, internal clock 139 may include multiple oscillators with different frequencies. Values output by different oscillators may be combined, e.g., using AND (or OR) operations, and data re-saving may be initiated when it is detected (e.g., by SDPM 135) that the combined output has a certain value, e.g., when the combined output changes from 0 or 1 (or from 1 to 0).

Figure 2B:
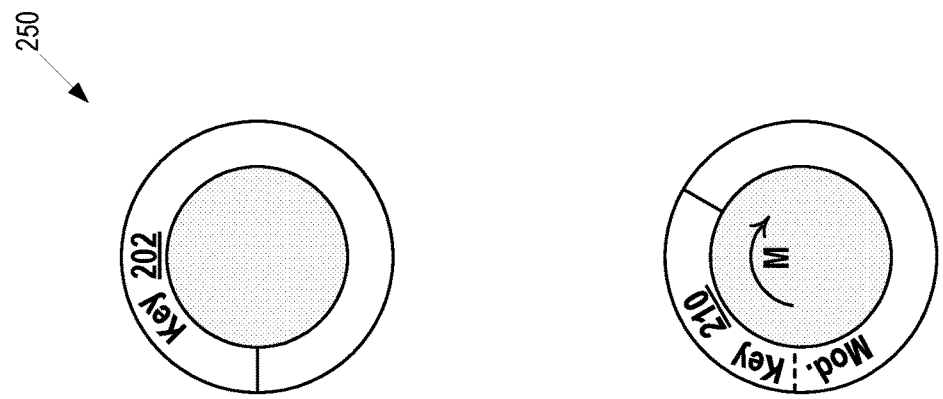
FIG. 2B illustrates example operations of protection of secret data by a circular shift, in accordance with one or more aspects of the present disclosure.
Figure 2A:
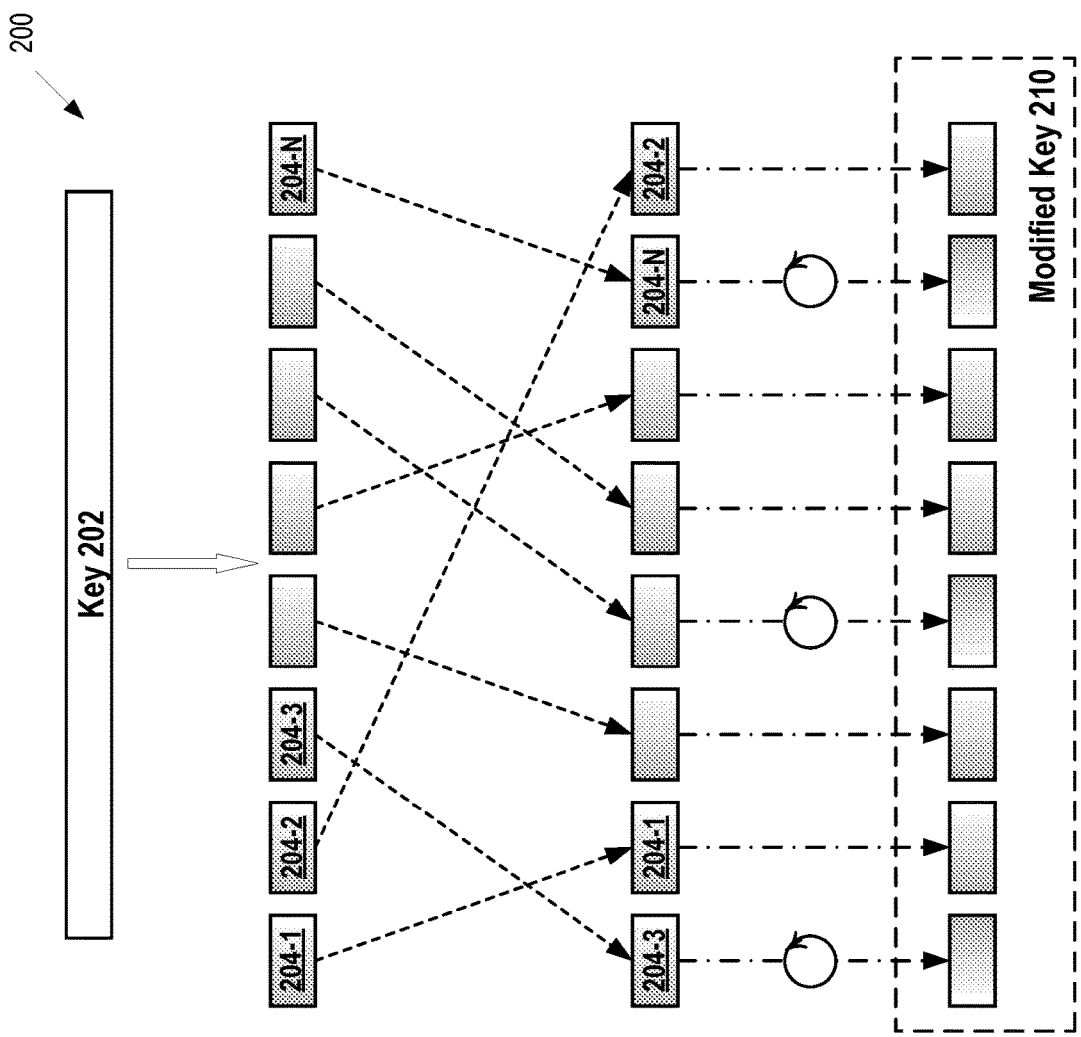
FIG. 2A illustrates example operations of protection of secret data by splitting the secret data into a plurality of portions, in accordance with one or more aspects of the present disclosure.

FIG. 2A illustrates example operations 200 of protection of secret data by splitting the secret data into a plurality of portions, in accordance with one or more aspects of the present disclosure. Example operations 200 may be implemented by memory controller 138 (e.g., performing instructions generated by SDPM 135). For brevity and conciseness, example operations 200 are illustrated in conjunction with a cryptographic key 202, but any other secret data may be protected by similar techniques. Example operations 200 may be performed in response to a request (e.g., by application(s) 110 or cryptographic accelerator 122) to retrieve key 202 from memory system 130. Alternatively, example operations 200 may be performed in response to a passage of time or an occurrence of a triggering event, and may involve storing key 202 in a modified form in memory system 130 (or in some other memory system communicatively coupled with memory system 130). Example operations 200 may include splitting key 202 into N portions 204-1, 204-2 . . . 204-N. Portions 204-x may be reshuffled (as shown with dashed arrows) in an order that is determined randomly or quasi-randomly. In one implementation, key 202 may be split into two portions and a control bit may be used to determine in which order of portions key 202 is to be provided (or re-saved). For example, if control bit has value 0 (or 1), key 202 can be provided (or re-saved) in the same order of portions in which the original key was stored; if control bit has value 1 (or 0), key 202 can be provided (or re-saved) in the opposite order (e.g., second portion provided first).

In one implementation, the control bit may be a designated bit of a specific register, which may be a shift register, for example a linear feedback shift register (LFSR), e.g., a full-cycle LFSR. The LSFR may be seeded with a random number and shifted each time key 202 is to be provided (or re-saved). Any predetermined bit of the LFSR (e.g., the senior bit, the second most senior bit, or any other bit) may be used as a control bit. The value of the control bit may be provided (or stored) together with the modified key, so that the original key 202 can be restored when used in an actual computation.

In some implementations, where key 202 is split into N>2 portions, a control value with multiple bits may be used to identify the order of portions 204-x of key 202. For example, control value may include 17 bits when N=8. More specifically, to identify a first portion of the modified (reshuffled) key 202, three bits may be used (identifying a number from 000 to 111). The same number (three) of control bits may be used to identify a second, third, and fourth portion of the modified key. Of the remaining four portions two two-bit numbers may be used to identify a fifth portion and a sixth portion, and another bit may be used to identify the order of the remaining two portions. For an arbitrary number of portions that is a power of two, $N=2^n$, the total number of bits of the control value may be $$\sum_{m=0}^{n-1}(m+1)2^m = 1+(n-1)2^n = 1+N\log_2\left(\frac{N}{2}\right).$$

The control value may be taken from consecutive bits of the LFSR, in one implementation. Alternatively, the control value may be taken from any bits of the LFSR designated as control bits.

In some implementations, in addition to reshuffling of the portions of key 202, one or more portions can further be modified, e.g., by reversing the order of bits in the respective portion. For example, N additional control bits (for the total of $1+N \log_2 N$ bits) may define which portions of key 202 are to be inverted. For example, portions whose dash-dotted lines are marked with circular arrows (e.g., portions 202-3 and 202-N, among others, are inverted). Although in FIG. 2A inversion is shown to be subsequent to shuffling, in some implementations inversion may be performed prior to shuffling. In some implementations, any of the portions may additionally be subjected to a circular shift, as described in more detail in relation to FIG. 2B. Subsequently to performing the obfuscation operations, modified key 210 may be provided over a bus or re-saved in the same (or a different) memory device.

FIG. 2B illustrates example operations 250 of protection of secret data by a circular shift, in accordance with one or more aspects of the present disclosure. Shown is a key 202 (or any other secret data), which is circularly shifted (rotated) by a value M between 0 and N−1 ("angle or rotation") determined by $\log_2 N$ bits of a control value. The control value may be obtained in any way described above in conjunction with FIG. 2A. The produced modified key 210 may then be provided (or re-saved) together with the control value.

Figure 3:
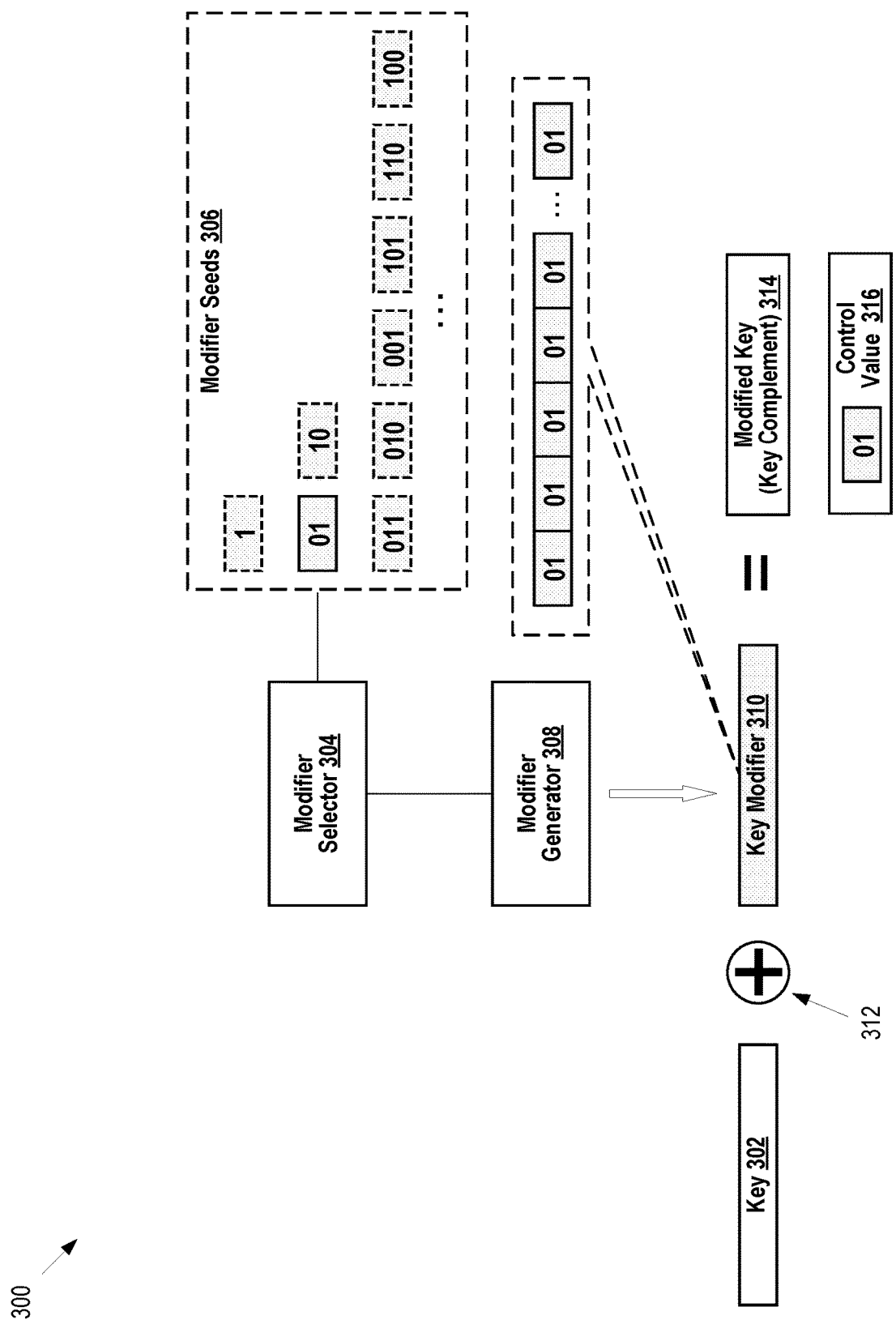
FIG. 3 illustrates example operations of protection of secret data by a transformation of the secret data to a bitwise complement, in accordance with one or more aspects of the present disclosure.

FIG. 3 illustrates example operations 300 of protection of secret data by a transformation of the secret data to a bitwise complement, in accordance with one or more aspects of the present disclosure. Although example operations 300 are illustrated with protection of cryptographic key 302, any other secret data may be protected by similar techniques. In one implementation, a key complement for an n-bit key may be obtained by a bitwise XOR addition (addition modulo 2) of the key to n-bit number consisting of n 1-bits (1111 . . . 1). A control value (e.g., a control bit) may be used to determine that key 302 is to be replaced with its complement before being provided (e.g., to CPU 120, cryptographic accelerator 122, or a requesting application) or re-saved on system memory 130. For example, control value 1 (or 0) may be used to indicate that key 320 is to be replaced with its complement whereas control value 0 (or 1) may be used to indicate that key 320 is provided in its original form (or left stored in system memory 130 in the original form). It should be understood that in generation of key complement(s) XOR addition may be replaced with any other reversible operation.

In some implementations, as depicted in FIG. 3, a selection may be made among multiple complements. A modifier selector 304 (e.g., a process executed by memory controller 138 and/or SDPM 135) may have access to one or more modifier seeds 306. Modifier seeds 306 may be any predefined value being used (in conjunction with a predefined procedure) to produce a key complement. For example, seed "1" may be repeated (concatenated), by modifier generator 308, n times to produce key modifier 310 that has the value [1111 . . . 1], as in the previous example. Similarly, seed "01" repeated n/2 times may lead to key modifier 310 that has value [0101 . . . 01]. Seed "0110" may similarly be repeated n/4 times to give key modifier [01100110 . . . 0110], and so on. Odd-bit seeds (e.g., "011") may also be used to produce n-bit key modifiers 310 using a defined procedure of truncating (senior or junior) bits that extend beyond the length of n bits. For example, if the seed "101" is used to generate a 64-bit key modifier 310 with junior bit truncation, the resulting key modifier may be [101101101 . . . 1011011]. If senior bit truncation is used, the corresponding key modifier 310 may be [1101101101 . . . 101101]. An arithmetic operation 312 (e.g., bitwise XOR or any reversible operation) may then be performed on key 302 to obtain a modified key (key complement) 314. In addition to modified key 314, a control value 316 that includes a representation of the modifier seed 306 used to produce key modifier 310 may be communicated (or stored) together with modified key 314 when modified key 314 is provided (or re-saved).

Control value 316 may be determined by modifier selector 304 from respective designated bits ("status bits") of a memory register, such as an LFSR seeded with a random number. In some implementations, control value 316 may be a function of any predetermined bits in an LFSR (possibly, non-consecutive bits.) In some implementations, control value 316 may be determined by a random number generator.

Figure 4:
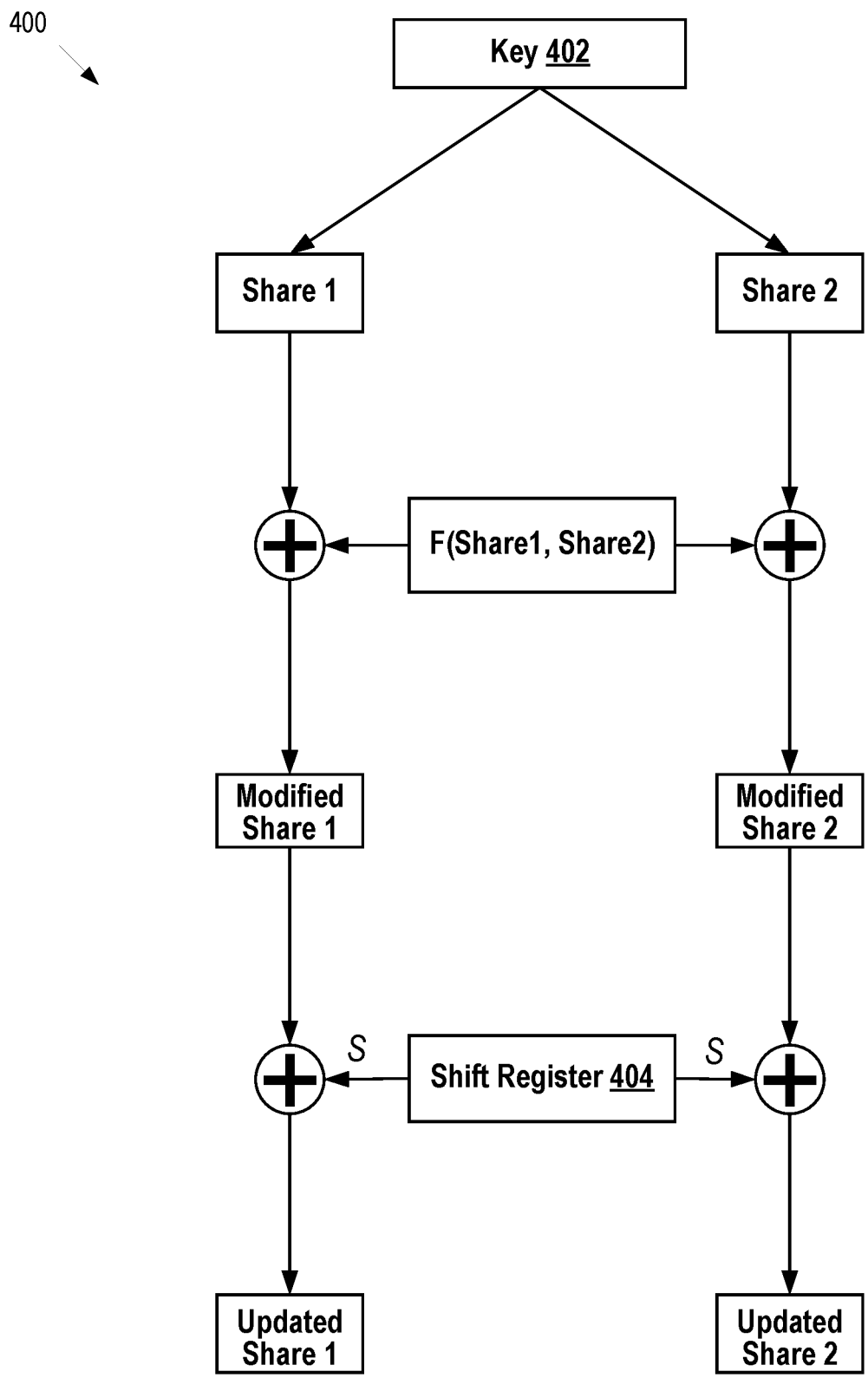
FIG. 4 illustrates example operations of protection of secret data by splitting secret data into multiple shares, in accordance with one or more aspects of the present disclosure.

FIG. 4 illustrates example operations 400 of protection of secret data by splitting secret data into multiple shares, in accordance with one or more aspects of the present disclosure. As depicted schematically in FIG. 4, a key 402 (or any other secret data) may be split into multiple shares. For brevity and conciseness, splitting into two shares is depicted, but it should be understood that splitting key 402 into any number of shares may be performed in a substantially similar way. A share may refer to any number that, subject to an arithmetic operation, may be used to recover the original data (e.g., key 402 or any other data). For example, a sum of two (or more) shares may restore key 402: Share 1+Share 2=Key. In some implementations, the addition is an XOR addition: Share 1⊕Share 2=Key. In some implementations, Share 1 is an arbitrary (e.g., random) number, R→Share 1, whereas Share 2 is the sum of the key and the random number, Key⊕R→Share 2. Key 402 may then be stored (or provided to a requesting entity) as two (or more) shares. To prevent an attacker from probing and determining the shares (and hence the sum of the shares), memory controller 138 may, from time to time, change the shares in a way that maintains their sum. For example, each of the two shares may be modified with a number (e.g., P):

Share 1⊕P=Modified Share 1,

Share 2⊕P=Modified Share 2.

Since P⊕P=0, the sum of the modified shares is the same as the sum of the original shares.

Performing subsequent modification of shares using the same number P (or any finite set of numbers $P_1, P_2 \ldots$) can limit possible values of shares to a finite set of values making key 402 less resilient to side-channel attacks. To make it more difficult for an attacker to probe shares of key 402, memory controller 138 may use a random number for P generated each time the shares are to be communicated over a bus or re-saved in memory. Generating many random numbers, however, may be computationally costly.

In some implementations, a random number may be used (e.g., once) to seed a pseudorandom number generator and to use the pseudorandom number generator to obtain a different number P every time new shares are generated. In some implementations, rather than using predefined values (lower protection) or random numbers (higher computational costs), memory controller 138 may use some deterministic function F(x) that determines P in terms of the existing shares. For example, function F(x) may be a function of the current Share 1: P=F(Share 1), or of the current Share 2: P=F(Share 2). In some implementations, the argument of function F(x) may be either Share 1 or Share 2, depending on a (probabilistically determined) value of a control bit (e.g., Share 1 is selected if control bit has value 0, and Share 2 is selected if control bit has value 1, or vice versa). Alternatively, function F(x, y) may be a function of two (or more) variables, P=F(Share 1, Share 2). Function F(x, y) may be a sum F(x, y)=F(x)⊕(y) of two functions of respective shares or a function that is not reduced to a sum of independent functions. In some implementations, function F(x, y) is not a symmetric function, F(x, y)≠F(y, x). In such implementations, choosing whether x=Share 1, y=Share 2, or x=Share 2, y=Share 1 may be determined probabilistically, based on the current value of the control bit, as described above.

In some implementations, different (other than bitwise XOR) arithmetic operations may be used to split (and recover) the value of key 402 into two (or more) shares. For example, a standard (not bitwise) addition (or subtraction) may be used to modify the shares of data. In such implementations, two different functions F1(x, y) and F2(x, y) may be used to produce Modified Share 1 and Modified Share 2. The functions F1(x, y) and F2(x, y) may then be chosen in such a way that the modification of Share 1 by F1(x, y) is compensated by the modification of Share 2 by F2(x, y). More specifically, the functions may be such that F1(x, y)+F2(x, y)=0.

The process of modifying shares may be repeated every time a request to provide key 402 is received, or every time key 402 is to be re-saved, and so on. In some instances (referring back to a situation where XOR operations are used and the functions F1(x, y) and F2(x, y) are the same), shares may be such that the function F(x, y) happens to have a root, F(Share 1, Share 2)=0. On such (albeit rare) occasions, modified shares may cease to change any further—a fixed-point is encountered. Similarly, function F(x, y) may lead to a short cycle, where the same values of shares are repeated every M cycles where M is not very large. Such situations may increase vulnerability of key 402 to side-channel attacks.

To prevent short-cycling of shares, an additional number may be generated and used to adjust modified shares. In one implementation, a number S (shift value) may be used to shift the modified shares:

Modified Share 1⊕S=Updated Share 1,

Modified Share 2⊕S=Updated Share 2.

Number S may be retrieved from a predetermined portion of shift register 404 (e.g., LFSR). Number S may be a single-bit number or a multi-bit number. Although in FIG. 4 updating (with number S) shares is performed after the shares are modified (with functions F(x, y)), in some implementations, updating may be performed prior to the modification of shares. This may prevent the occurrence of a fixed point or a short cycle with equal efficiency. In some implementations, updating may not be performed for every cycle; e.g. updating may be performed once per several cycles (of key retrieval or storing) or once per random number of cycles (as may be determined by a control value).

In some implementations, key 402, shares of key 402, and function F(x, y) (or functions F1(x, y) and F2(x, y)) may be defined on a finite (Galois) field of order $2^n$ such that an element on the final field is a polynomial of degree n−1 with addition of polynomials defined modulo 2 and multiplication of polynomials defined modulo an irreducible polynomial of degree n. In one implementation, functions F1(x, y) may be defined as sums, $F1(x,y)=a \cdot x + b \cdot y$ $F2(x,y)=c \cdot x + d \cdot y$ with the coefficients a, b, c, d satisfying the following identity: a+c=b+d=1. This ensures that modified shares add up to the same value as the initial shares: F1(x, y)+F2(x, y)=x+y.

Additionally, to prevent occurrence of a fixed point and/or a short cycle, the coefficients may be chosen to satisfy a further relation, a+b+1=z, where z is a primitive element of the finite field, such that a sequence z, $z^2$, $z^3$, . . . constitutes a cyclic group with $2^n-1$ elements.

In some implementations, a second shift register may be used to introduce an irregularity in stepping shift register 404. For example, one or more status bits of the second shift register (e.g., LFSR) may be used to determine a number of steps (cycles) over which shift register 404 may be advanced. For example, if three status bits of the second shift register currently store value [110], shift register 404 may be advanced over 6 steps (cycles). Alternatively, no second shift register may be used and the status bits may be read directly from designated bits of the shift register 404 itself.

FIGS. 5A-C and FIG. 6 depict flow diagrams of example methods 501, 502, 503, and 600 of protection of secret data during communication or storage, in accordance with one or more aspects of the present disclosure. Methods 501, 502, 503, and 600 disclosed below, and/or each of their individual functions, routines, subroutines, or operations may be performed by one or more processing units of the computing system implementing the methods, e.g., memory controller 138, CPU 120, or some other processing device (an arithmetic logic unit, an FPGA, and the like, or any processing logic, hardware or software or a combination thereof). In certain implementations, each of methods 501, 502, 503, and 600 may be performed by a single processing thread. Alternatively, each of methods 501, 502, 503, and 600 may be performed by two or more processing threads, each thread executing one or more individual functions, routines, subroutines, or operations of the method. In an illustrative example, the processing threads implementing each of methods 501, 502, 503, and 600 may be synchronized (e.g., using semaphores, critical sections, and/or other thread synchronization mechanisms). Alternatively, the processing threads implementing each of methods 501, 502, 503, and 600 may be executed asynchronously with respect to each other. Various operations of each of methods 501, 502, 503, and 600 may be performed in a different order compared with the order shown in FIGS. 5A-C and FIG. 6. Some blocks may be performed concurrently with other blocks. Some blocks may be optional. Some or all of the blocks of each of methods 501, 502, 503, and 600 may be performed by secret data protection module 135. Method 501, 502, 503, and 600 may be implemented to protect secret data, e.g., cryptographic keys, secret messages, files, and other information.

Figure 5A:
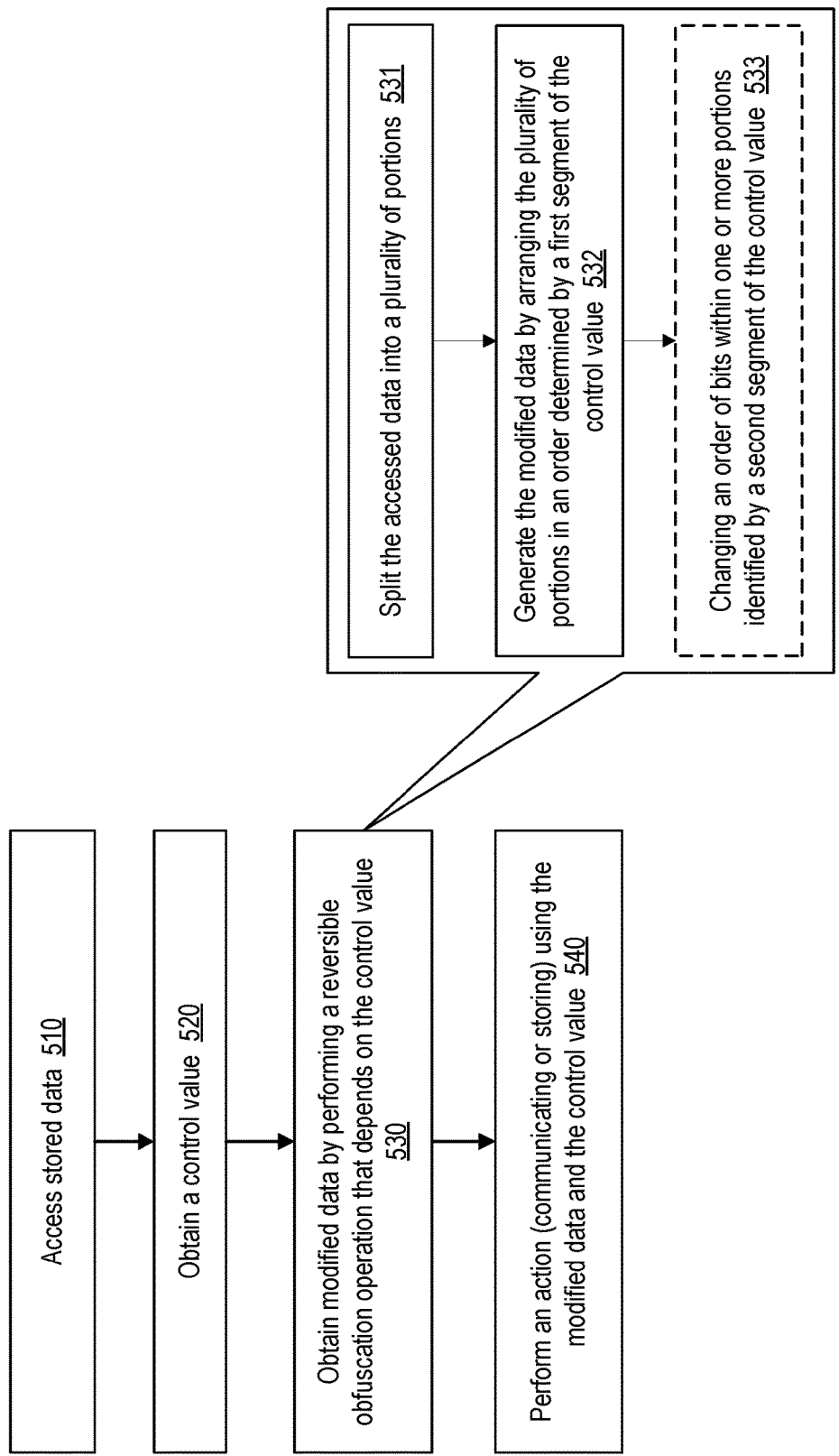
FIG. 5A depicts a flow diagram of an example method of protection of secret data by splitting the secret data into a plurality of portions, in accordance with one or more aspects of the present disclosure.

FIG. 5A depicts a flow diagram of an example method 500 of protection of secret data by splitting the secret data into a plurality of portions, in accordance with one or more aspects of the present disclosure. Method 500 may involve a processing device (e.g., memory controller 138) accessing, at block 510, a data stored on a memory device. Accessing the stored data may be responsive to an outside request for the data, e.g. a request from a cryptographic software application, a cryptographic accelerator circuit, or any other device or component. In response to the request, the data is provided in a modified form. Alternatively, accessing the stored data may be responsive to a passage of time, e.g., a controller of the memory device accessing the stored data to re-save the data in a modified form. In some implementations, re-saving the data may be performed in response to an outside request, so that both the data provided in response to the request is modified (from its stored form) and the data is re-saved in a modified form. The data may be re-saved in the same modified form in which it is provided to the requesting entity or in a form different from both the stored form and the modified form. In particular, two (or more) instances of method 500 (or methods 501, 503, or 600) may be executed one after another to produce multiple modified forms of the same data.

At block 520, method 500 may continue with the processing device obtaining a control value. The control value may be any random, quasi-random, or deterministic data that defines how protection (obfuscation) of the secret data is to be performed. The control value may be a single-bit value or a multi-bit value. The number of bits in the control value may be at least a number sufficient to specify how the modification of the data is to be performed, but may in some instances have additional bits.

At block 530, the processing device performing method 500 may obtain modified data by performing an obfuscation operation on the accessed data. The obfuscation operation may be a reversible operation that depends on the control value. In some implementations, the control value may be obtained from a memory register whose content is updated prior to obtaining the modified data. More specifically, the memory register may be a (full cycle) linear feedback shift register. In some implementations, the linear feedback shift register may be seeded with a random value and shifted every cycle, which may be every time the stored data is accessed. As depicted by the blowout section of FIG. 5A, obtaining the modified data may include a number of operations. For example, as depicted by block 531, the accessed data may be split into a plurality of portions. In some implementations, a number of portions may be fixed (e.g., predetermined by the algorithm being used). In other implementations, however, the number of portions may itself be determined by a segment of the control value. For example, a three-bit segment of the control value may have a value n∈[0,7] that indicates into how many portions (e.g., n+1) the data is to be split (with the value 000 indicating that the data is to be provided in the unmodified form).

At block 532, method 500 may include generating the modified data by arranging the plurality of portions in an order determined by a first segment of the control value. The terms "first segment" and "second segment" should be understood as identifiers only and do not imply any particular order of the segments of the control value. As described above, in connection with FIG. 2, the first segment may include a first number that identifies a first portion (in the order of portions to be saved or provided), a second number that identified a second portion, and so on. At (optional) block 533, method 500 may include selecting one or more portions and changing an order of bits within each of the selected portions. In some implementations, the portions selected for the order change may be identified by a second segment of the control value. For example, the second segment may specifically enumerate portions whose order is to be changed. Alternatively, the second segment may identify a pattern of portions whose order is to be changed. For example, value 11 may indicate that the order of bits is changed in all portions, value 10 may indicate the bit order change for only odd portions, value 01 may indicate the bit order change of only even portions, and value 00 may indicate that no portions have bits reordered. Order change may include reversal of the order of all bits in a portion, interchanging a first part of the portion with a second part (e.g., the first half with the second half), circular rotation of bits within a part of the portion (e.g., cyclic rotation of bits within each m-bit part of the portion), or any one of practically unlimited number of ways in which the bits may be reordered. In some implementations, the pattern for intra-portion reordering may itself be obtained from the second segment of the control value. In some implementations, the first segment of the control value and the second segment of the control value may be non-overlapping (e.g., given by different bits of the LFSR). In some implementations, the first segment and the second segment may be partially or completely overlapping.

At block 540, the processing device performing method 500 may perform an action using the modified data and the control value. The action may include communicating the modified data to a cryptographic application (or any other requesting entity). The action may include storing, in the memory device, the modified data and the control value. In some implementations, the portions of the modified data (and the control value) may be concatenated and provided as a linear array of bits. In some implementations, the modified data may be stored in a memory device that is different from the memory device initially storing the data. In some implementations, the action may include both communicating and storing the data.

Figure 5B:
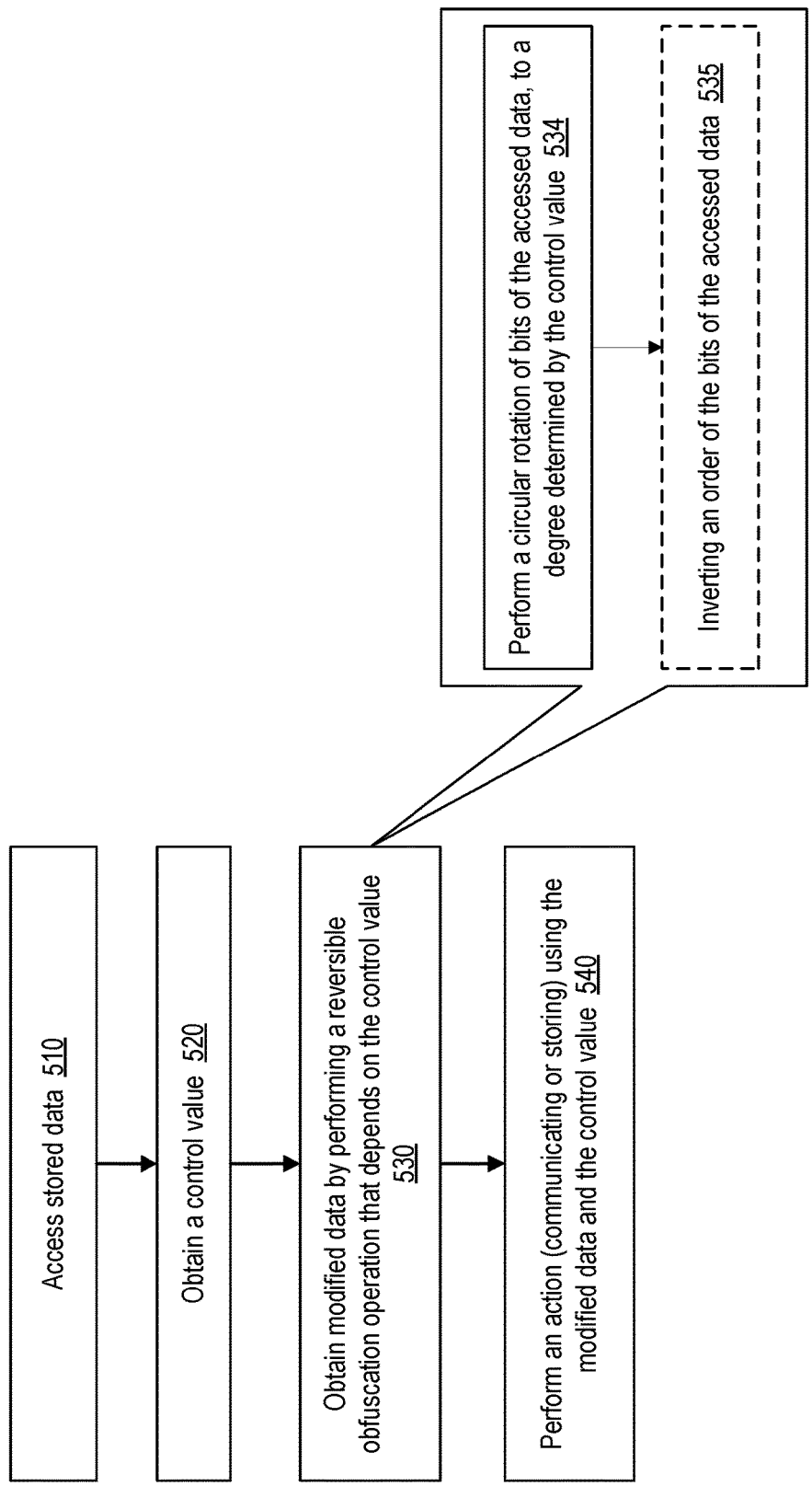
FIG. 5B depicts a flow diagram of an example method of protection of secret data by a circular rotation of the secret data, in accordance with one or more aspects of the present disclosure.

FIG. 5B depicts a flow diagram of an example method 501 of protection of secret data by a circular rotation of the secret data, in accordance with one or more aspects of the present disclosure. Blocks 510-520 of method 501 may be performed similarly to the respective blocks of method 500. Block 530, as indicated by the blowout section, may include block 534 where the processing device performs a circular rotation of bits of the accessed data, to a degree determined by the control value. It should be understood that block 530 of method 501 may further include any of the operations of method 500, e.g., any of the obfuscation operations of blocks 531, 532, and/or 533, which may be performed prior to, together with, or after operations of block 534. As one specific non-limiting example, method 501 may include inverting, at block 535, an order of the bits of the accessed data. Inverting the order may be performed after the circular rotation of the bits (as shown in FIG. 5B). In some implementations, inverting the order may be performed prior to the rotation of the bits. In some implementations, inverting the order of bits may be performed without any rotation of the bits, so that the modified data $b_N b_{N-1} \ldots b_2 b_1$ is simply the inverted sequence $b_1 b_2 \ldots b_{N-1} b_N$ of the initial data. At block 540, method 501 may continue with the processing device performing an action using the modified data and the control value, e.g., as described in connection with the respective block 540 of method 500.

Figure 5C:
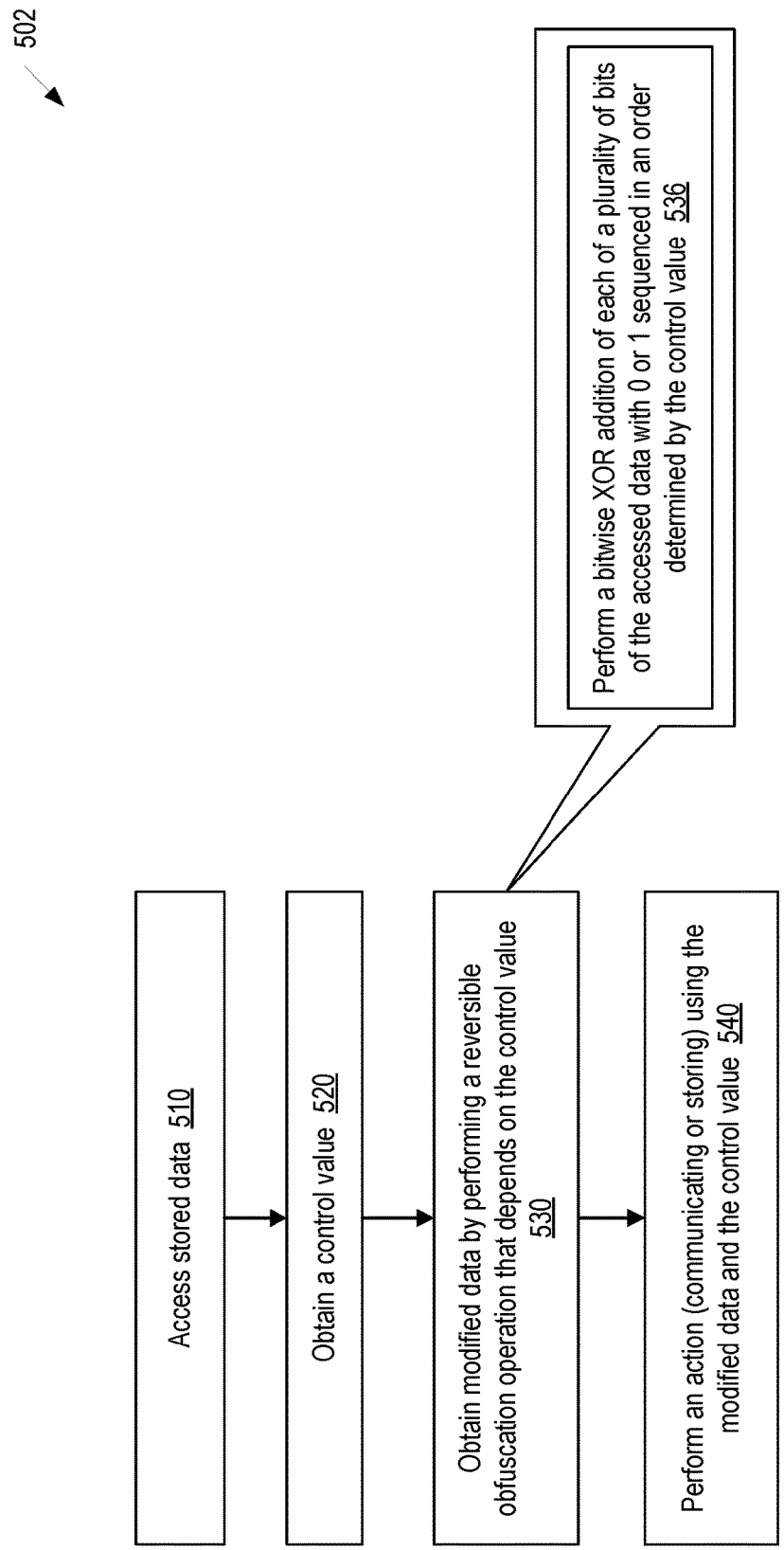
FIG. 5C depicts a flow diagram of an example method of protection of secret data by splitting the secret data into a plurality of shares, in accordance with one or more aspects of the present disclosure.

FIG. 5C depicts a flow diagram of an example method 502 of protection of secret data by splitting the secret data into a plurality of shares, in accordance with one or more aspects of the present disclosure. Blocks 510-520 of method 502 may be performed similarly to the respective blocks of method 500. Block 530, as indicated by the blowout section, may include block 536 where the processing device performs a bitwise XOR addition of each of a plurality of bits of the accessed data with 0 or 1 sequenced in an order determined by the control value. For example, a two-bit control value (or a two-bit segment of the control value) 11 may indicate that the data is to be XOR-added to a number consisting of only bits 1, control value 01 (or 10) may indicate that the data is to be XOR-added to a number consisting of concatenated two-bit groups 01 (or 10), whereas control value 00 may indicate that the data is not modified. In some implementations, the control value may be or include a value obtained from a memory register whose content is updated prior to obtaining the modified data. It should be understood that block 530 of method 502 may further include any of the operations of block 530 of method 500 or method 501, e.g., any of the obfuscation operations of blocks 531, 532, 533, 534 and/or 535, which may be performed prior to, together with, or after operations of block 536. At block 540, method 502 may continue with the processing device performing an action using the modified data and the control value, e.g., as described in connection with the respective block 540 of method 500.

Figure 6:
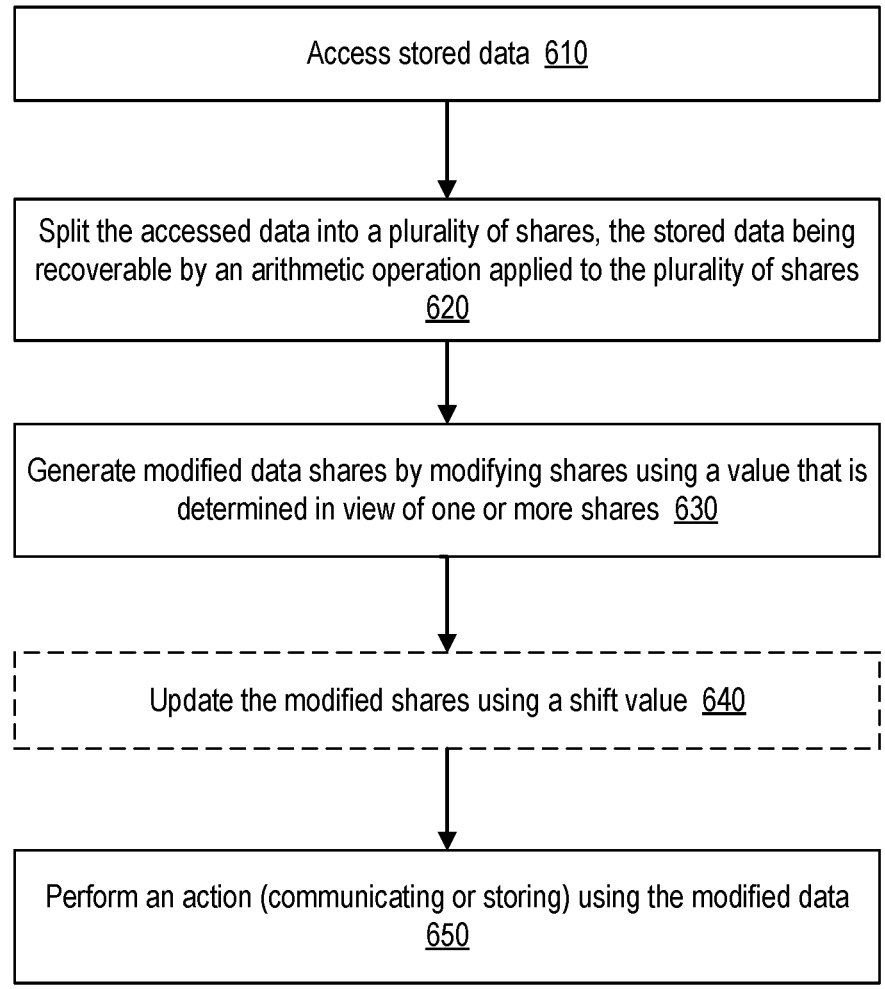
FIG. 6 depicts a flow diagram of an example method of protection of secret data by modifying shares of secret data in view of the values of the shares, in accordance with one or more aspects of the present disclosure.

FIG. 6 depicts a flow diagram of an example method 600 of protection of secret data by modifying shares of secret data in view of the values of the shares, in accordance with one or more aspects of the present disclosure. Accessing data stored on a memory device at block 610 may be performed similarly to block 510 of method 500. At block 620, the processing device performing method 600 may split the accessed data into a plurality of shares. Splitting the data may be performed in any way that makes the stored data recoverable by a first arithmetic operation (addition, subtraction, bitwise XOR operation, etc.) applied to the plurality of shares.

At block 630, the processing device performing method 600 may generate modified data, which may include a plurality of modified shares. Each of the plurality of modified shares is generated by modifying the respective share using a value that is determined in view of one or more shares of the plurality of shares. For example, shares x and y may be modified by a function F(x) (e.g., x→x⊕F(x); y→y⊕F(x)) or by multiple functions (e.g., x→x⊕F(x)⊕G(y); y→y⊕F(x)⊕G(y)). In some implementations, in addition to modifying shares, the shares may be swapped (e.g., x→y⊕F(x); y→x⊕F(x)). A practically unlimited number of ways to modify the shares in view of the current values of the shares may be devised. The modification of shares may be performed in a way that ensures that the stored data is recoverable by a second arithmetic operation applied to the plurality of modified shares. In some implementations, the second arithmetic operation may be of the same type as the first arithmetic operation. For example, both the first and the second arithmetic operations may be bitwise XOR operations. In some implementations, the second arithmetic operation may be of a different type than the first arithmetic operation. For example, the first arithmetic operation may be addition (subtraction) whereas the second arithmetic operation may be subtraction (addition).

In some implementations, the plurality of modified shares $\{x'_j\}$ is a matrix product of a weight matrix $A_{jk}$ and the plurality of shares $\{x_j\}$: $x'_j = \Sigma_k A_{jk} x_k$. Elements of the weight matrix $A_{jk}$ (as well as shares and modified shares) may be elements of a finite field of order $2^n$, wherein n is a number of bits of the stored data. A sum of elements of a first partition of the weight matrix may be a unity element of the finite field. "First partition" may refer to a column (e.g., first column, second column, etc.) of the weight matrix $A_{jk}$, such that $\Sigma_j A_{j1} = \Sigma_j A_{j2} = = 1$. This condition ensures that the sum of modified shares is the same as the sum of the original shares, $\Sigma_j x'_j = \Sigma_j x_j$. Additionally, in at least some implementations, a sum of the unity element of the finite field and each element of a second partition of the weight matrix $A_{jk}$ may be a primitive element of the finite field. "Second partition" may refer to a row (e.g., a first row), so that the sum $1 + \Sigma_k A_{1k}$ is a primitive element of the finite field. Alternatively, "second partition" may refer to a second (third, etc.) row of the weight matrix $A_{jk}$.

In some implementations, shares $\{x_j\}$ may be defined in a way that it is their linear combination $\Sigma_j v_j x_j$ (rather than the sum of the shares $\Sigma_j x_j$) that represents the secret data. To allow the same secret data to be extracted after any number of modification steps, the vector $\{v_j\}$ may be a left-eigenvector of weight matrix $A_{jk}$ corresponding to eigenvalue 1, such that $\Sigma_j v_j x'_j = \Sigma_j \Sigma_k v_j A_{jk} x_k = \Sigma_k v_k x_k$, thus ensuring that the secret data is correctly recovered. Additionally, in at least some implementations, the least common multiple of the multiplicative orders of the other eigenvalues of $A_{jk}$ may be large, e.g. by making one or more of the eigenvalues a primitive element of the finite field.

At block 640, the processing device performing method 600 may update each of the plurality of the modified shares in view of one or more shift values, for example by adjusting $x'_j + S_j \rightarrow X_j$, using shift value $S_1$ (as well, as additional shift values $S_2$, $S_3$, etc., as may be used, such that $\Sigma_k S_k = 0$). The shift value(s) may be read from a memory register whose content is updated prior to generating the modified data (e.g., in response to a request to provide the data). In some implementations, the memory register may be a linear feedback shift register seeded with a random value. At block 650, the processing device performing method 600 may perform an action using the modified data. The action may be at least one of i) communicating the modified data (e.g., to a cryptographic application or any other requesting entity), or ii) storing the modified data in the memory device (which may be the same or different than the memory device that was storing the initial data).

Execution of any of methods 500, 501, 502, and 600 may be controlled by an internal clock of the memory device. For example, any of methods 500, 501, 502, and 600 may be performed responsive to the internal clock of the memory device generating a predetermined output, e.g., value 0 or 1 or any other value.

Figure 7:
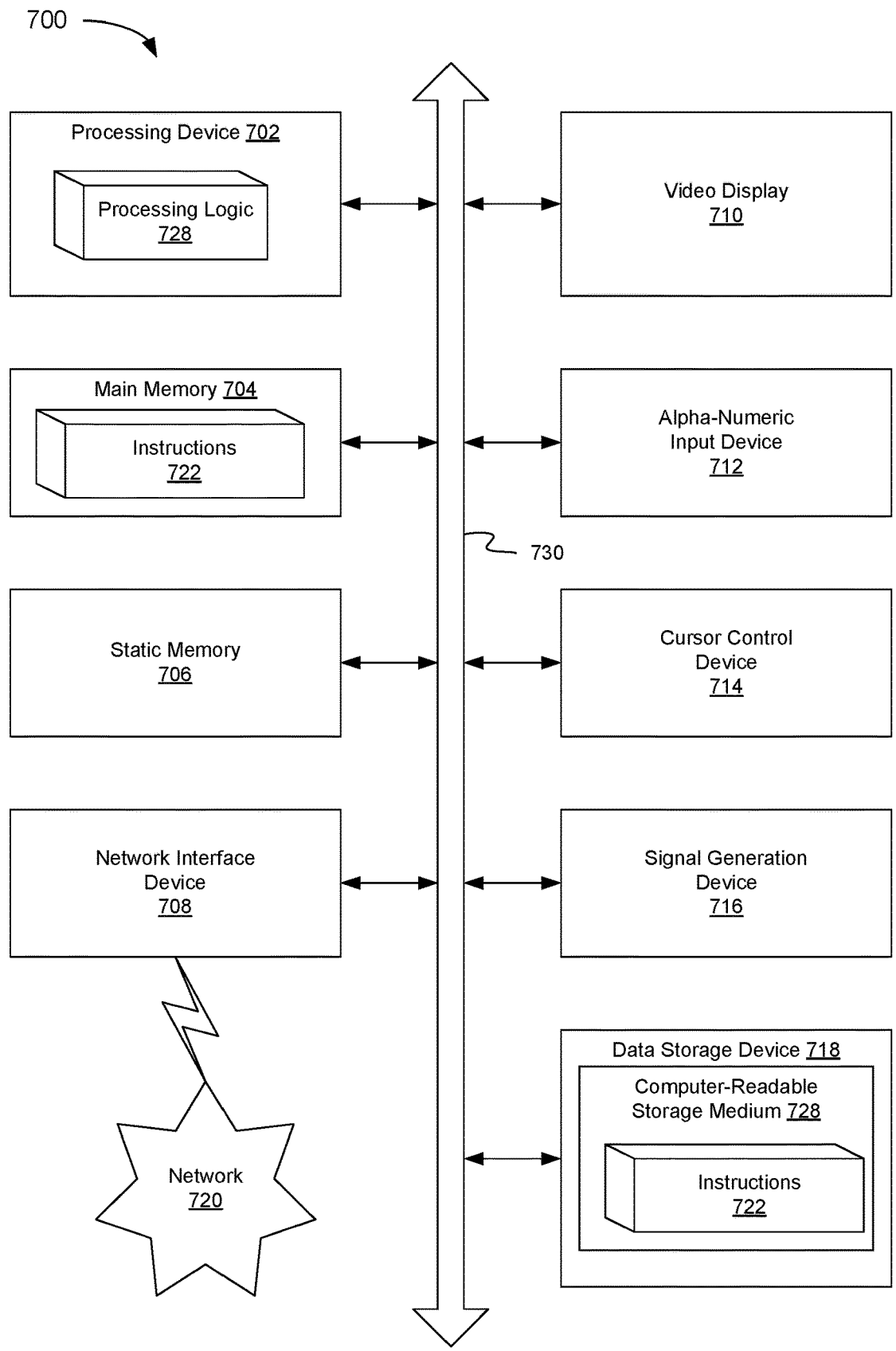
FIG. 7 depicts a block diagram of an example computer system operating in accordance with one or more aspects of the present disclosure.

FIG. 7 depicts a block diagram of an example computer system 700 operating in accordance with one or more aspects of the present disclosure. In various illustrative examples, computer system 700 may represent the computer device 102, illustrated in FIG. 1.

Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), which may include processing logic 727, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 500 of protection of secret data by splitting the secret data into a plurality of portions, method 501 of protection of secret data by a circular rotation of the secret data, method 502 of protection of secret data by splitting the secret data into a plurality of shares, and method 600 of protection of secret data by modifying shares of secret data in view of the values of the shares.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 500 of protection of secret data by splitting the secret data into a plurality of portions, method 501 of protection of secret data by a circular rotation of the secret data, method 502 of protection of secret data by splitting the secret data into a plurality of shares, and method 600 of protection of secret data by modifying shares of secret data in view of the values of the shares.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method of cryptographic protection of a data, the method comprising:
    accessing, by a processing device, the data stored on a memory device;
    selecting, by the processing device, a control value;
    obtaining, by the processing device, modified data by performing an obfuscation operation on the accessed data, wherein the obfuscation operation comprises one or more of:
        a rearrangement of a plurality of portions of the accessed data in an order determined by the control value, or
        an addition of the accessed data to a value comprising a plurality of copies of the control value;
    performing, by the processing device, an action using the modified data and the control value, wherein the action comprises at least one of:
        communicating the modified data and the control value to a cryptographic application; or
        storing, in the memory device, the modified data and the control value.

2. The method of claim 1, wherein obtaining the modified data comprises: splitting the accessed data into the plurality of portions; and
    generating the modified data by arranging the plurality of portions in an order determined by a first segment of the control value.

3. The method of claim 2, wherein obtaining the modified data further comprises:
    changing an order of bits within each of one or more portions of the plurality of portions, the one or more portions identified by a second segment of the control value.

4. The method of claim 2, wherein a number of portions of the plurality of portions is determined by a second segment of the control value.

5. The method of claim 1, wherein the control value comprises a value obtained from a memory register whose content is updated prior to obtaining the modified data.

6. The method of claim 5, wherein the memory register is a linear feedback shift register seeded with a random value.

7. The method of claim 1, wherein obtaining the modified data comprises: performing a circular rotation of bits of the accessed data, to a degree determined by the control value.

8. The method of claim 7, wherein obtaining the modified data further comprises:
    inverting an order of the bits of the accessed data.

9. The method of claim 7, wherein obtaining the modified data further comprises:
    performing a bitwise XOR addition of each of a plurality of bits of the accessed data with 0 or 1 sequenced in an order determined by the control value.

10. The method of claim 1, wherein the control value comprises a value obtained from a memory register whose content is updated prior to obtaining the modified data.

11. The method of claim 1, performed responsive to an internal clock of the memory device generating a predetermined output.

12. A system comprising: a memory device; and
    a processing device communicatively coupled to the memory device, the processing device to:
    access data stored on the memory device;
    select a control value;

obtain modified data by performing an obfuscation operation on the accessed data, wherein the obfuscation operation comprises one or more of:
 a rearrangement of a plurality of portions of the accessed data in an order determined by the control value, or
 an addition of the accessed data to a value comprising a plurality of copies of the control value;
perform an action using the modified data and the control value, wherein the action comprises at least one of:
 communicating the modified data and the control value to a cryptographic application; or
 storing, in the memory device, the modified data and the control value.

13. The system of claim 12, wherein to obtain the modified data, the processing device is to perform a circular rotation of bits of the accessed data, to a degree determined by the control value.

14. The system of claim 13, wherein to obtain the modified data, the processing device is further to perform at least on of:
 invert an order of the bits of the accessed data; or
 perform a bitwise XOR addition of each of a plurality of bits of the accessed data with 0 or 1 sequenced in an order determined by the control value.

15. The system of claim 12, wherein the control value comprises a value obtained from a memory register whose content is updated prior to obtaining the modified data.

16. The system of claim 12, wherein to obtain the modified data, the processing device is to:
 split the accessed data into a plurality of portions; and
 generate the modified data by arranging the plurality of portions in an order determined by a first segment of the control value.

17. The system of claim 16, wherein to obtain the modified data, the processing device is further to:
 change an order of bits within each of one or more portions of the plurality of portions, the one or more portions identified by a second segment of the control value.

18. The system of claim 16, wherein a number of portions of the plurality of portions is determined by a second segment of the control value.

19. The system of claim 12, wherein the control value comprises a value obtained from a memory register whose content is updated prior to obtaining the modified data.

20. A non-transitory computer readable memory storing instructions that, when executed by a processing device, cause the processing device to:
access a data stored on a memory device;
select a control value;
obtain modified data by performing an obfuscation operation on the accessed data, wherein the obfuscation operation comprises one or more of:
 a rearrangement of a plurality of portions of the accessed data in an order determined by the control value, or
 an addition of the accessed data to a value comprising a plurality of copies of the control value;
perform an action using the modified data and the control value, wherein the action comprises at least one of:
 communicating the modified data and the control value to a cryptographic application; or
 storing, in the memory device, the modified data and the control value.

* * * * *